US011697623B2

(12) United States Patent
Crutchfield

(10) Patent No.: US 11,697,623 B2
(45) Date of Patent: Jul. 11, 2023

(54) METHOD TO PRODUCE A CERAMIC MATRIX COMPOSITE WITH CONTROLLED SURFACE CHARACTERISTICS

(71) Applicant: Rolls-Royce Corporation, Indianapolis, IN (US)

(72) Inventor: Jeffrey Crutchfield, Long Beach, CA (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 190 days.

(21) Appl. No.: 17/324,593

(22) Filed: May 19, 2021

(65) Prior Publication Data

US 2021/0395156 A1  Dec. 23, 2021

Related U.S. Application Data

(60) Provisional application No. 63/040,639, filed on Jun. 18, 2020.

(51) Int. Cl.
*C04B 41/50* (2006.01)
*C04B 41/00* (2006.01)
(Continued)

(52) U.S. Cl.
CPC ........ *C04B 41/5024* (2013.01); *C04B 37/003* (2013.01); *C04B 41/009* (2013.01); *C04B 41/86* (2013.01); *F01D 5/282* (2013.01); *F01D 5/288* (2013.01); *F02C 7/30* (2013.01); *C04B 2237/083* (2013.01); *C04B 2237/16* (2013.01); *C04B 2237/38* (2013.01); *C04B 2237/61* (2013.01); *F05D 2220/32* (2013.01); *F05D 2230/90* (2013.01); *F05D 2240/10* (2013.01);
(Continued)

(58) Field of Classification Search
CPC .......... F01D 5/282; F01D 5/284; F01D 5/288; B32B 18/00; F05D 2230/90; C04B 2237/16; C04B 2237/38; C04B 35/80
See application file for complete search history.

(56) References Cited

U.S. PATENT DOCUMENTS 6,280,550 B1 * 8/2001 Steibel .................. C04B 35/565
156/212
8,940,417 B2 1/2015 Courcot et al.
(Continued)

*Primary Examiner* — Topaz L. Elliott
(74) *Attorney, Agent, or Firm* — Crowell & Moring LLP

(57) ABSTRACT

A method to produce a ceramic matrix composite with controlled surface characteristics includes: applying a scrim ply to a surface of a fiber preform, where the fiber preform includes silicon carbide fibers coated with boron nitride; infiltrating the fiber preform and the scrim ply with a slurry, thereby forming an impregnated ply on an impregnated fiber preform; infiltrating the impregnated fiber preform and the impregnated ply with a melt comprising silicon, and then cooling, thereby forming a ceramic matrix composite having a ceramic surface layer thereon, where the ceramic surface layer has a predetermined thickness and is devoid of boron; machining or grit blasting the ceramic surface layer to form an intermediate layer suitable for coating; and depositing an environmental barrier coating on the intermediate layer. Thus, a ceramic matrix composite coated with the environmental barrier coating is formed with the intermediate layer in between.

20 Claims, 3 Drawing Sheets

(51) Int. Cl.
 *C04B 41/86* (2006.01)
 *F02C 7/30* (2006.01)
 *C04B 37/00* (2006.01)
 *F01D 5/28* (2006.01)

(52) U.S. Cl.
 CPC ...... *F05D 2240/24* (2013.01); *F05D 2240/35* (2013.01); *F05D 2240/55* (2013.01)

(56) References Cited

U.S. PATENT DOCUMENTS

| | | | |
|---|---|---|---|
| 9,713,912 B2* | 7/2017 | Lee | C23C 28/3455 |
| 2008/0149255 A1 | 6/2008 | Whiteker et al. | |
| 2011/0219775 A1* | 9/2011 | Jarmon | C04B 41/85 |
| | | | 60/753 |
| 2013/0029117 A1* | 1/2013 | Read | F01D 5/282 |
| | | | 156/308.2 |
| 2013/0122259 A1* | 5/2013 | Lee | C04B 41/5024 |
| | | | 428/164 |
| 2013/0210299 A1* | 8/2013 | Zhang | C23C 28/345 |
| | | | 156/280 |
| 2013/0309096 A1* | 11/2013 | Le Bras | B29C 65/7841 |
| | | | 156/499 |
| 2014/0261080 A1* | 9/2014 | Lee | C23C 14/30 |
| | | | 427/596 |
| 2016/0017749 A1* | 1/2016 | Luthra | C04B 41/52 |
| | | | 428/448 |
| 2016/0230570 A1* | 8/2016 | Harris | C04B 35/80 |
| 2016/0273088 A1* | 9/2016 | Cybulsky | C04B 41/52 |
| 2017/0101348 A1 | 4/2017 | Wan et al. | |
| 2017/0113976 A1* | 4/2017 | Shim | F01D 5/288 |
| 2018/0202300 A1* | 7/2018 | Landwehr | C04B 41/52 |
| 2018/0305263 A1 | 10/2018 | Shim | |
| 2018/0370863 A1* | 12/2018 | Li | C04B 41/89 |
| 2019/0048730 A1 | 2/2019 | Subramanian et al. | |
| 2019/0111636 A1* | 4/2019 | Van Nieuwenhove | |
| | | | B29C 70/228 |
| 2019/0338660 A1* | 11/2019 | Underwood | F01D 25/12 |
| 2020/0024977 A1* | 1/2020 | Shi | C04B 41/52 |
| 2020/0040746 A1* | 2/2020 | Jackson | C04B 41/52 |
| 2021/0292245 A1* | 9/2021 | Bouillon | B29C 70/24 |
| 2021/0332709 A1* | 10/2021 | Liles | B28B 11/04 |
| 2022/0055957 A1* | 2/2022 | Shim | C04B 41/89 |
| 2022/0341335 A1* | 10/2022 | Gong | F01D 5/288 |
| 2022/0363605 A1* | 11/2022 | Crutchfield | B28B 23/0006 |

* cited by examiner

METHOD TO PRODUCE A CERAMIC MATRIX COMPOSITE WITH CONTROLLED SURFACE CHARACTERISTICS

RELATED APPLICATION

The present patent document claims the benefit of priority under 35 U.S.C. § 119(e) to U.S. Provisional Patent Application No. 63/040,639, which was filed on Jun. 18, 2020, and is hereby incorporated by reference in its entirety.

TECHNICAL FIELD

The present disclosure relates generally to the fabrication of a ceramic matrix composite (CMC) and more particularly to fabrication of a CMC with controlled surface characteristics.

BACKGROUND

Ceramic matrix composites, which include ceramic fibers embedded in a ceramic matrix, exhibit a combination of properties that make them promising candidates for industrial applications, such as gas turbine engines, that demand excellent thermal and mechanical properties along with low weight. A ceramic matrix composite that includes a silicon carbide matrix reinforced with silicon carbide fibers may be referred to as a silicon carbide/silicon carbide composite (or SiC/SiC composite). Fabrication of SiC/SiC composites typically includes a melt infiltration step in which a SiC fiber preform is exposed to molten silicon, which is drawn into the (porous) fiber preform via capillary forces and reacts to form the SiC matrix. The SiC fiber preform may include SiC fibers that are coated with boron nitride (BN) or other compliant layers known in the art. After melt infiltration and cooling, the densified ceramic matrix composite (CMC) may undergo surface machining or a similar process which may lead to exposure of the coated SiC fibers at or near the surface, making the CMC susceptible to various problems in use.

BRIEF DESCRIPTION OF THE DRAWINGS

The embodiments may be better understood with reference to the following drawing(s) and description. The components in the figures are not necessarily to scale. Moreover, in the figures, like-referenced numerals designate corresponding parts throughout the different views.

DETAILED DESCRIPTION

Described herein is method for fabricating a ceramic matrix composite (CMC) with controlled surface characteristics. The method is described below in reference to the cross-sectional schematics of FIGS. 1A-1F.

Figure 1A:
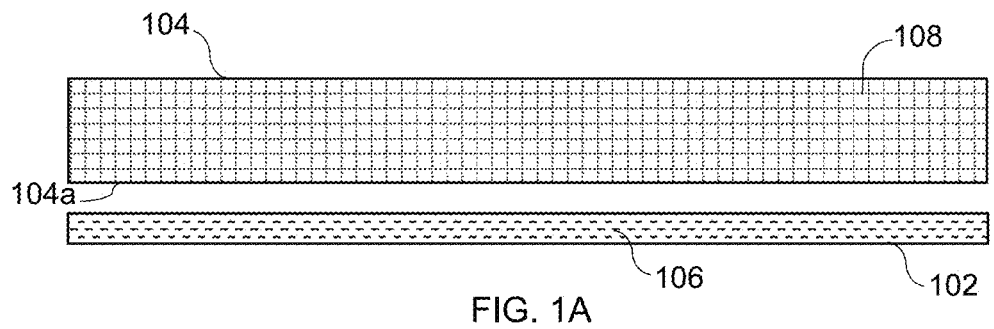
FIGS. 1A-1F show cross-sectional schematics of exemplary steps of the method.
Figure 1B:
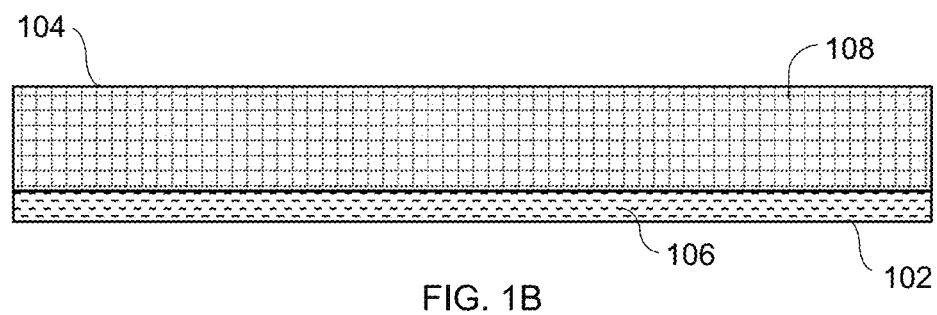

Referring first to FIGS. 1A and 1B, the method includes applying a scrim ply 102 to a surface 104a of a fiber preform 104. The scrim ply 102 may include silicon carbide (SiC) and/or carbon (C) fibers 106 in a woven or nonwoven arrangement. As discussed below, the scrim ply 102 may have a predetermined and controlled thickness. The fiber preform 104 may comprise a three-dimensional framework of SiC fibers 108, which are coated with boron nitride (BN) and may be referred to as BN-coated SiC fibers 108. The application of the scrim ply 102 to the surface 104a may be carried out by hand or using other methods, as discussed below. Tooling may be employed to secure the scrim ply 102 to the surface 104a of the fiber preform 104.

Figure 1C:
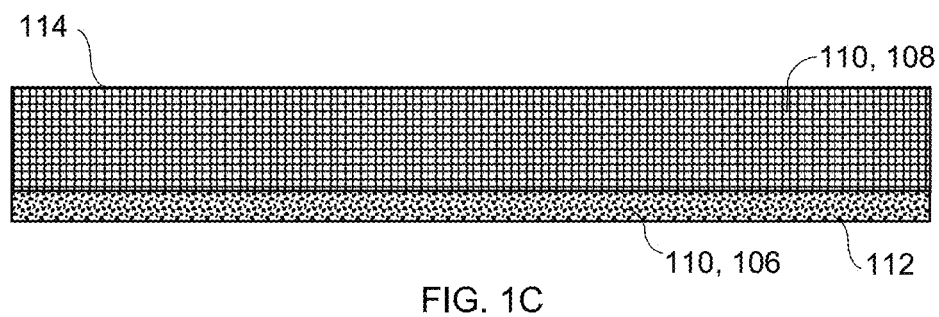

In a next step, the fiber preform 104 and the scrim ply 102 are infiltrated with a slurry 110, thereby forming an impregnated ply 112 on an impregnated fiber preform 114, as illustrated in FIG. 1C. The slurry 110 may include ceramic (e.g., SiC) particles and optionally particulate reactive elements (e.g., carbon) in a liquid carrier, which may comprise an aqueous or organic solvent and/or a preceramic polymer, such as polycarbosilane, polysiloxane, or polysilazane. To achieve infiltration, all or a part of the fiber preform 104 and the scrim ply 102 may be submerged in the slurry. The slurry 110 permeates interstices between the fibers 106,108 during infiltration, penetrating the fiber preform 104 and the scrim ply 102. After infiltration, the slurry 110 may be dried, which may entail curing of the preceramic polymer and/or removing (e.g., evaporating) the aqueous or organic solvent. The SiC particles and any other ceramic particles or particulate reactive elements (e.g., carbon) that may have been included in the slurry 110 are preferably not removed during drying, and instead remain in the fiber preform 104. Upon drying, the impregnated ply 112 may adhere to the impregnated fiber preform 114, such that any tooling employed to secure the scrim ply 102 to the surface 104a of the preform 104 may be removed.

Figure 1D:
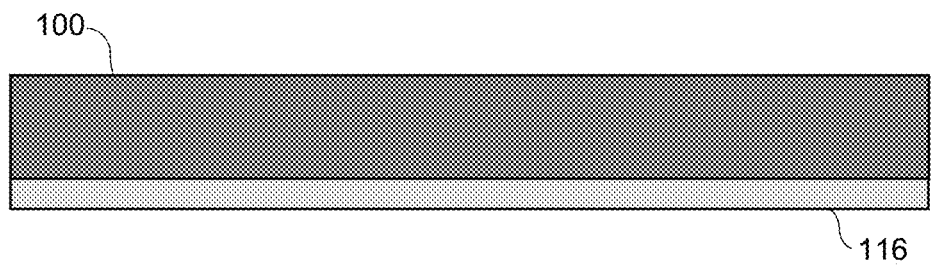

Referring now to FIG. 1D, the impregnated fiber preform and the impregnated ply are infiltrated with a melt comprising silicon, and then cooled, forming a densified ceramic matrix composite 100 with a dense ceramic surface layer 116 thereon, where the surface layer 116 has a controlled or predetermined thickness, which may be defined by the scrim ply. The melt may consist of silicon or a silicon alloy. Melt infiltration may be carried out at a temperature at or above the melting temperature of silicon or the silicon alloy that is infiltrated. Thus, the temperature for melt infiltration is typically in a range from about 1350° C. to about 1500° C. During melt infiltration, molten material flows through the impregnated ply 112 and the impregnated fiber preform 114, reacting with any reactive elements in the flow path and surrounding any ceramic particles or fibers 108,106 (e.g., SiC) present prior to melt infiltration, such that the ceramic matrix and the ceramic surface layer 116 are formed upon cooling. A suitable time duration for melt infiltration may be from 15 minutes to four hours, depending in part on the size and complexity of the ceramic matrix composite 100 to be formed. Following melt infiltration and cooling, the ceramic matrix of the composite 100 and/or the surface layer 116 may include a residual amount of unreacted silicon or silicon alloy, and there may also be a residual amount of carbon. Preferably, there is no more than about 20 vol. %, or no more than about 10 vol. % unreacted silicon or residual carbon. Ideally, the amount of unreacted silicon or residual carbon is no greater than about 5 vol. %.

After melt infiltration, the ceramic matrix composite 100 includes the BN-coated SiC fibers in a ceramic matrix that includes SiC and optionally other ceramics; thus, the ceramic matrix composite 100 may be referred to as a SiC/SiC composite. Due to the presence of the BN-coated SiC fibers, near-surface regions of the SiC/SiC composite 100 may contain boron. In contrast, the ceramic surface layer 116 formed upon melt infiltration and cooling of the impregnated ply 112 may include SiC and possibly other ceramics, but is devoid of boron, including elemental boron and any boron-containing compounds, such as BN. Accordingly, the ceramic surface layer 116 may be described as containing substantially no boron, e.g., 0 wt. % B or no higher than 0.1 wt. % B.

Figure 1E:
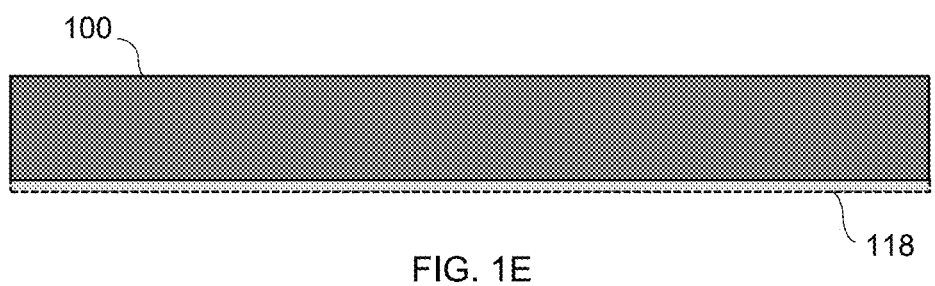

After the densified ceramic matrix composite 100 and the ceramic surface layer 116 are formed, the ceramic surface layer 116, which is devoid of boron, undergoes machining or grit blasting to remove material and achieve a desirable level of roughness on the surface, thereby forming an intermediate layer 118 suitable for coating, as illustrated in FIG. 1E. The machining or grit blasting are carried out in a controlled manner to avoid complete removal of the ceramic surface layer 116. Like the ceramic surface layer 116, the intermediate layer 118 may comprise SiC and optionally other ceramics, and may be substantially boron-free (e.g., contain 0 wt. % B or no higher than 0.1 wt. % B). In some examples, the surface layer 116 and/or the intermediate layer may comprise only SiC, and no additional ceramics. A residual amount of unreacted silicon or carbon, as described above, may also be present in the layers 116, 118.

Figure 1F:
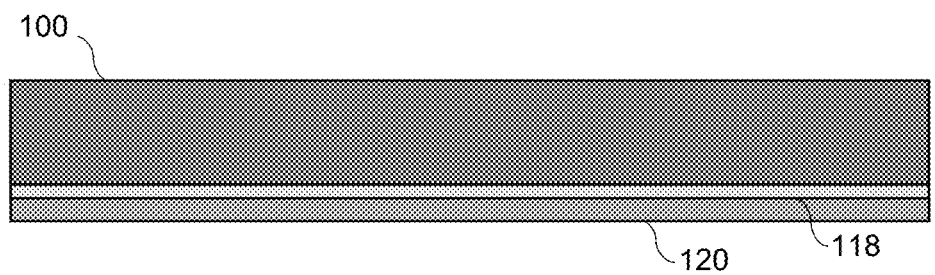

Next, as shown in FIG. 1F, an EBC 120 is deposited on the intermediate layer 118 to form a SiC/SiC composite 100 including the EBC 120 with the intermediate layer in between. The EBC 120 may help to protect the SiC/SiC composite 100 from degradation in a high temperature combustion environment, and thus may be made from a refractory material with excellent environmental resistance. In one example, the EBC 120 may comprise a rare earth silicate having a chemical formula $RE_2SiO_5$ or $RE_2Si_2O_7$, where RE represents a rare earth metal; examples include $Y_2SiO_5$, $Yb_2SiO_5$, $Yb_2Si_2O_7$, and $Lu_2SiO_5$. Preferably, the EBC 120 does not include boron and is resistant to the formation of boron-containing phases, which may cause spallation of the EBC 120 or other problems. With the intermediate layer 118 between the SiC/SiC composite 100 and the EBC 120, boron diffusion into the EBC 120 and the formation of undesirable boron-containing phases may be inhibited or prevented altogether. Without applying the surface layer 116 to the SiC/SiC composite 100, machining or grit blasting could expose the BN-coated SiC fibers, making the overlying EBC 120 susceptible to boron diffusion and phase formation. After formation of the intermediate layer 118, the EBC 120 may be deposited by chemical vapor deposition (CVD) or physical vapor deposition (PVD), or another coating method known in the art. Typically, the EBC 120 has a thickness in a range from about 0.002 in (~0.05 mm) to about 0.010 in (~0.25 mm).

The scrim ply 102 includes SiC fibers and/or C fibers 106 ("the fibers 106"), as indicated above. The scrim ply 102 may comprise a unidirectional arrangement, a random arrangement, a plain weave, a twill weave, or a multi-harness weave of the fibers 106, which may be continuous or short fibers. The scrim ply 102 may further include a polymeric binder to constrain the fibers 106. Typically, the scrim ply 102 has a thickness in a range from about 0.010 in (~0.25 mm) to about 0.020 in (~0.51 mm). The thickness of the scrim ply 102 may determine the thickness of the surface layer 116. For example, the ceramic surface layer 116 may have a predetermined thickness in a range from about 0.010 in (~0.25 mm) to about 0.025 in (~0.64 mm), which is similar to or slightly larger than the thickness of the scrim ply 102. The ceramic surface layer 116 may be highly uniform as a consequence of being formed from the scrim ply 102. For example, the ceramic surface layer 116 may have a thickness uniformity of +/−25% of the predetermined thickness, and it may also be +/−10% of the predetermined thickness. The intermediate layer 118 formed upon machining or grit blasting the ceramic surface layer 116 may have a significantly reduced thickness, which may lie in a range from about 0.002 in (~0.05 mm) to about 0.010 in (~0.25 mm).

The SiC fibers 108 of the fiber preform 104 are typically continuous SiC fibers. The BN coated on the SiC fibers 108 may comprise BN and/or Si-doped BN, and may provide for a weak fiber-matrix interface in the densified CMC 100, thereby improving the fracture toughness of the composite 100. Thus, the BN coating is often referred to as a BN interface layer. In addition to the BN interface layer, the SiC fibers 108 may include a rigidization layer comprising SiC on the BN interface layer, and optionally additional layers. Both the BN interface layer and the rigidization layer, and the optional additional layers, may be formed by chemical vapor infiltration (CVI) using conditions known in the art. Accordingly, the fiber preform 104 may be a rigidized fiber preform, where the SiC fibers 108 include the BN layer and the rigidization layer, and optionally additional layers. The fiber preform may be formed by laying up plies comprising tows of the SiC fibers 108 arranged in a two- or three-dimensional weave to form a three-dimensional framework of the SiC fibers 108. Typically after the lay-up, the SiC fibers 108 are coated with the BN interface layer, the rigidization layer, and any additional layers to form the rigidized fiber preform.

The scrim ply 102 may be applied to part or all of the surface 104a of the fiber preform 104, which as explained above may be a rigidized fiber preform. The scrim ply 102 may be held in place on the surface 104a of the preform 104 by a tool, such as a clamp. In some examples, a number of scrim plies 102 may be applied to the surface 104a in a layered, overlapping and/or adjacent (side-by-side) configuration. The term "scrim ply 102" as used herein is understood to refer to one or more scrim plies 102 which may be applied to the surface 104a of the fiber preform 104. As indicated above, the scrim ply 102 may be manually applied to the surface of the fiber preform 104. In other words, the scrim ply may be positioned by hand on the surface of the fiber preform 104. Alternatively, the application of the scrim ply 102 to the surface of the fiber preform 104 may be automated. For example, the scrim ply 102 may be applied to the surface using an inflation pressure supplied by an inflatable bladder. A scrim ply 102 positioned between the surface of the fiber preform 104 and the inflatable bladder may be controllably pressed against the surface 104a as the bladder is inflated.

Figure 2:
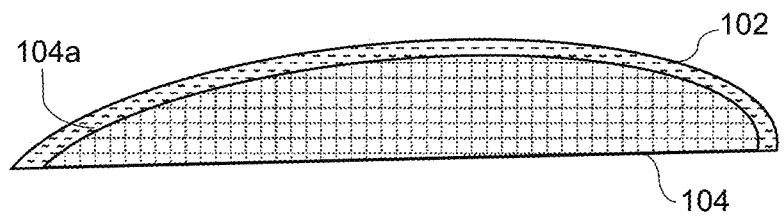
FIG. 2 illustrates application of a scrim ply to a surface of a curved fiber preform.

Whether applied manually or in an automated process, the scrim ply 102 may conform to the surface 104a. The fiber preform 104 shown in FIGS. 1A and 1B has a simple three-dimensional (3D) shape with planar surfaces; however, the fiber preform 104 is not limited to this geometry and may have any shape suitable for the intended application of the CMC 100. For example, the fiber preform 104 may have a more complex curved 3D shape suitable for a particular component, as shown by the cross-sectional schematic of FIG. 2. Upon application to the surface 104a, the scrim ply 102 may follow contours or curves of the fiber preform 104, as illustrated in FIG. 2. The exemplary fiber preform 104 and the scrim ply 102 shown in FIG. 2 may undergo the entire process illustrated in FIGS. 1C-1F, as described above. Accordingly, a ceramic surface layer 116 formed after slurry and melt infiltration may be uniform in thickness, as described above, even for ceramic matrix composites 100 having complex geometries.

Figure 3:
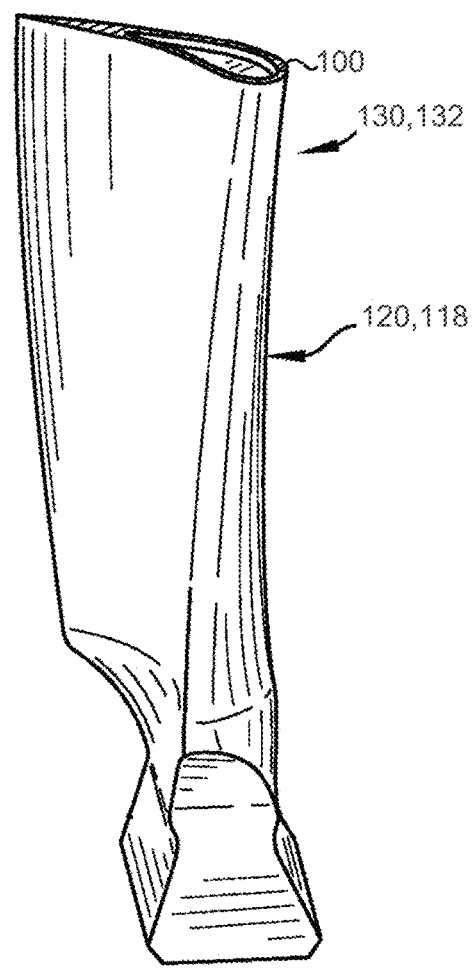
FIG. 3 shows an exemplary turbine blade comprising a ceramic matrix composite coated with an environmental barrier coating, where an intermediate layer prepared as described in this disclosure lies between the coating and the composite.

A gas turbine engine component 130 may comprise the ceramic matrix composite 100 formed as described above, where the ceramic matrix composite is coated with the EBC 120, and wherein an intermediate layer 118 lies between the composite 100 and the EBC 120. Advantageously, diffusion of boron to the EBC 120 is inhibited or prevented by the intermediate layer 118. In one example, the gas turbine engine component 130 may be a turbine blade 132 or vane, as illustrated in FIG. 3. Alternatively, the component 130 may be a combustion liner or seal segment.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a method to produce a ceramic matrix composite with controlled surface characteristics that includes: applying a scrim ply to a surface of a fiber preform, where the fiber preform includes silicon carbide fibers coated with boron nitride; infiltrating the fiber preform and the scrim ply with a slurry, thereby forming an impregnated ply on an impregnated fiber preform; infiltrating the impregnated fiber preform and the impregnated ply with a melt comprising silicon, and then cooling, thereby forming a ceramic matrix composite having a ceramic surface layer thereon, where the ceramic surface layer has a predetermined thickness and is devoid of boron; machining or grit blasting the ceramic surface layer to form an intermediate layer suitable for coating; and depositing an environmental barrier coating on the intermediate layer. Thus, a ceramic matrix composite coated with the environmental barrier coating is formed with the intermediate layer in between. Diffusion of boron to the environmental barrier coating is inhibited or prevented by the intermediate layer.

A second aspect relates to the method of the first aspect, wherein the scrim ply comprises fibers in a nonwoven arrangement, a unidirectional arrangement, a plain weave, a twill weave, or a multi-harness weave.

A third aspect relates to the method of the first or second aspect, wherein the scrim ply comprises silicon carbide fibers and/or carbon fibers.

A fourth aspect relates to the method of any preceding aspect, wherein the scrim ply has a thickness in a range from about 0.25 mm to about 0.5 mm.

A fifth aspect relates to the method of any preceding aspect, wherein the fiber preform is a rigidized fiber preform, and further comprising, prior to applying the scrim ply: laying up a number of plies, each ply comprising an arrangement of the silicon carbide fibers; and, after the lay-up, coating the silicon carbide fibers with the boron nitride and a rigidization layer comprising silicon carbide, thereby forming the rigidized fiber preform.

A sixth aspect relates to the method of any preceding aspect, wherein the predetermined thickness of the surface layer is in a range from about 0.25 mm to about 0.6 mm.

A seventh aspect relates to the method any preceding aspect, wherein the surface layer exhibits a thickness uniformity of +/−10% of the predetermined thickness.

A eighth aspect relates to the method of any preceding aspect, wherein the intermediate layer has a thickness in a range from about 0.05 mm to about 0.25 mm.

A ninth aspect relates to the method of any preceding aspect, wherein the ceramic surface layer and the intermediate layer comprise silicon carbide.

A tenth aspect relates to the method of any preceding aspect, wherein the environmental barrier coating comprises a rare-earth silicate.

An eleventh aspect relates to the method of any preceding aspect, wherein the slurry comprises silicon carbide particles and particulate reactive elements in a liquid carrier comprising an aqueous solvent, an organic solvent, and/or a preceramic polymer.

A twelfth aspect relates to the method of any preceding aspect, wherein the melt consists of silicon.

A thirteenth aspect relates to the method of any preceding aspect, wherein the melt comprises a silicon alloy.

A fourteenth aspect relates to the method of any preceding aspect, wherein applying the scrim ply to the surface of the fiber preform comprises manually positioning the scrim ply.

A fifteenth aspect relates to the method of any preceding aspect, wherein applying the scrim ply to the surface of the fiber preform comprises using an inflation pressure supplied by an inflatable bladder.

A sixteenth aspect relates to the method of any preceding aspect, wherein the scrim ply is secured to the surface of the fiber preform by a tool.

A seventeenth aspect relates to the method of any preceding aspect, wherein the scrim ply conforms to the surface of the fiber preform.

An eighteenth aspect relates to the method of any preceding aspect, wherein the infiltration with the slurry occurs while the scrim ply is secured to the surface by a tool.

A nineteenth aspect relates a gas turbine engine component comprising: the ceramic matrix composite coated with the environmental barrier coating according to any preceding aspect, wherein the intermediate layer lies between the ceramic matrix composite and the environmental barrier coating, wherein the ceramic matrix composite is a SiC/SiC composite, and wherein the environmental barrier coating comprises a rare earth silicate.

A twentieth aspect relates to the gas turbine engine component of the nineteenth aspect, wherein the gas turbine engine component comprises a blade, vane, combustion liner or seal segment.

In addition to the features mentioned in each of the independent aspects enumerated above, some examples may show, alone or in combination, the optional features mentioned in the dependent aspects and/or as disclosed in the description above and shown in the figures.

What is claimed is:
1. A method to produce a ceramic matrix composite with controlled surface characteristics, the method comprising:

applying a scrim ply to a surface of a fiber preform, the fiber preform including silicon carbide fibers coated with boron nitride, the scrim ply having a thickness in a range from 0.25 mm to 0.5 mm;

infiltrating the fiber preform and the scrim ply with a slurry, thereby forming an impregnated ply on an impregnated fiber preform;

infiltrating the impregnated fiber preform and the impregnated ply with a melt comprising silicon, and then cooling, thereby forming a ceramic matrix composite having a ceramic surface layer thereon, the ceramic surface layer having a predetermined thickness and being devoid of boron;

machining or grit blasting the ceramic surface layer to form an intermediate layer suitable for coating; and depositing an environmental barrier coating on the intermediate layer, thereby forming a ceramic matrix composite coated with the environmental barrier coating with the intermediate layer in between, whereby diffusion of boron to the environmental barrier coating is inhibited or prevented by the intermediate layer.

2. The method of claim 1, wherein the scrim ply comprises fibers in a nonwoven arrangement, a unidirectional arrangement, a plain weave, a twill weave, or a multi-harness weave.

3. The method of claim 1, wherein the scrim ply comprises silicon carbide fibers and/or carbon fibers.

4. The method of claim 1, wherein the fiber preform is a rigidized fiber preform, and further comprising, prior to applying the scrim ply:

laying up a number of plies, each ply comprising an arrangement of the silicon carbide fibers; and after the lay-up, coating the silicon carbide fibers with the boron nitride and a rigidization layer comprising silicon carbide, thereby forming the rigidized fiber preform.

5. The method of claim 1, wherein the predetermined thickness of the ceramic surface layer is in a range from 0.25 mm to 0.6 mm.

6. The method of claim 1, wherein the ceramic surface layer exhibits a thickness uniformity of +/−10% of the predetermined thickness.

7. The method of claim 1, wherein the intermediate layer has a thickness in a range from 0.05 mm to 0.25 mm.

8. The method of claim 1, wherein the ceramic surface layer and the intermediate layer comprise silicon carbide.

9. The method of claim 1, wherein the environmental barrier coating comprises a rare-earth silicate.

10. The method of claim 1, wherein the slurry comprises silicon carbide particles and particulate reactive elements in a liquid carrier comprising an aqueous solvent, an organic solvent, and/or a preceramic polymer.

11. The method of claim 1, wherein the melt consists of silicon.

12. The method of claim 1, wherein the melt comprises a silicon alloy.

13. The method of claim 1, wherein applying the scrim ply to the surface of the fiber preform comprises manually positioning the scrim ply.

14. The method of claim 1, wherein applying the scrim ply to the surface of the fiber preform comprises using an inflation pressure supplied by an inflatable bladder.

15. The method of claim 1, wherein the scrim ply is secured to the surface of the fiber preform by a tool.

16. The method of claim 1, wherein the scrim ply conforms to the surface of the fiber preform.

17. The method of claim 1, wherein the infiltration with the slurry occurs while the scrim ply is secured to the surface by a tool.

18. A gas turbine engine component comprising:

the ceramic matrix composite coated with the environmental barrier coating according to the method of claim 1, wherein the intermediate layer lies between the ceramic matrix composite and the environmental barrier coating, and wherein the ceramic matrix composite is a SiC/SiC composite, and wherein the environmental barrier coating comprises a rare earth silicate.

19. The gas turbine engine component of claim 18 being selected from the group consisting of: a blade, a vane, a combustion liner, and a seal segment.

20. The method of claim 1, wherein the scrim ply comprises silicon carbide fibers.

* * * * *